(No Model.) 2 Sheets—Sheet 2.
L. P. COHEN & H. C. WOLTERECK.
DIFFERENTIAL GEAR FOR BICYCLES.
No. 597,877. Patented Jan. 25, 1898.
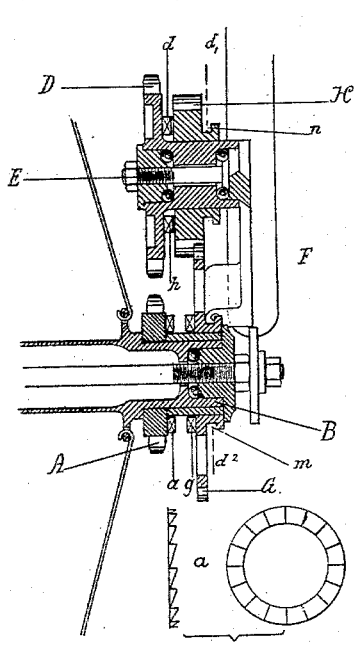
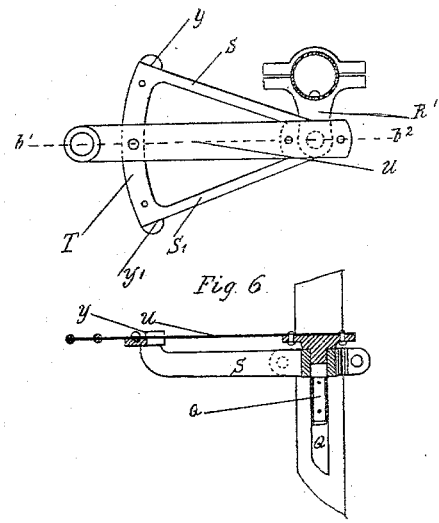
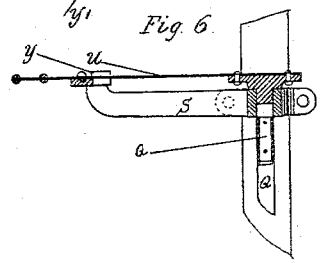
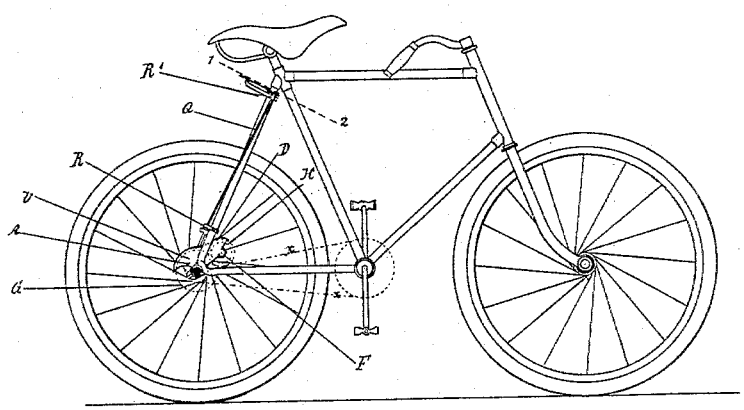
WITNESSES:
J. P. Koch
T. Schipper
INVENTORS
Louis Ph. Cohen.
Herman C. Woltereck
by Herman C. Woltereck
ATTORNEYS.
THE NORRIS PETERS CO., PHOTO-LITHO., WASHINGTON, D. C.

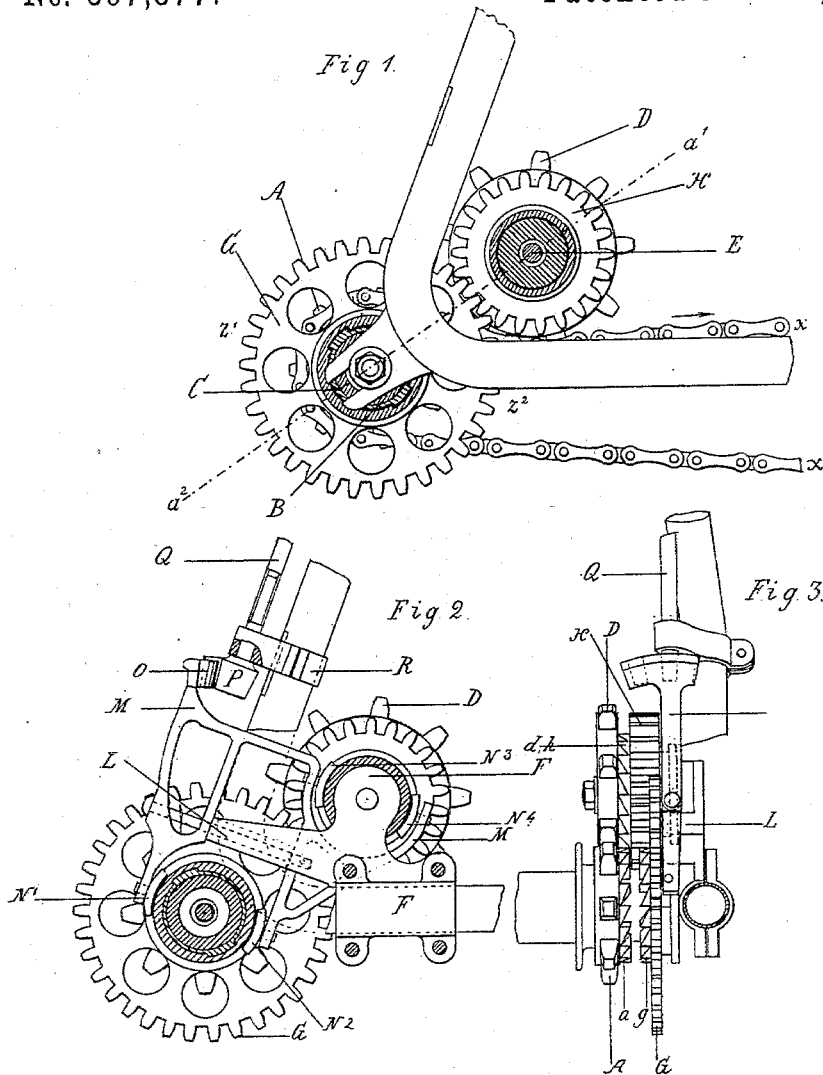

UNITED STATES PATENT OFFICE.

LOUIS PH. COHEN AND HERMAN C. WOLTERECK, OF NEW YORK, N. Y.

DIFFERENTIAL GEAR FOR BICYCLES.

SPECIFICATION forming part of Letters Patent No. 597,877, dated January 25, 1898.

Application filed January 9, 1897. Serial No. 618,578. (No model.)

*To all whom it may concern:*

Be it known that we, LOUIS PH. COHEN, a citizen of France, and HERMAN C. WOLTERECK, a citizen of the United States, residing at New York, in the county and State of New York, have invented a new and useful Differential Gear for Bicycles, of which the following is a specification.

Our invention relates to improvements in differential gear for bicycles, by means of which the speeding-gear of a bicycle may be temporarily changed into a gear of low speed, such as will be desirable in ascending hills or descending steep roads, in which coasting or fast riding would be connected with danger. The low-speed gear may also serve as a brake, as the sudden change from a high to a low gear will require the feet of the rider to move much faster and will thus find a strong retarding element in the counteraction of the same.

The object of this invention has long been a problem for many inventors who have tried to obtain the desired effect by more or less complicated gears or by the application of several chains. All these constructions require a wheel built especially for their use, while our device may be easily attached to any existing wheel of the safety type by the mere insertion of a new hub for the rear wheel. We obtain this object by means of the arrangement shown in the accompanying drawings, in which—

Figure 1 shows the front elevation of our gear in section $d'\ d^2$ in Fig. 4. Fig. 2 gives a front view of the shifting lever in position corresponding to Fig. 1. Fig. 3 is a side view of Fig. 2 in section-line $a'\ a^2$, Fig. 1. Fig. 4 is a section of the gear, as indicated by $a'\ a^2$, Fig. 1. Fig. 5 is a top view of the operating crank or handle of the shifting lever. Fig. 6 is a section of the same in line $b'\ b^2$. Fig. 7 shows a wheel with our device attached.

Similar letters refer to similar parts throughout the several views.

The sprocket-wheel A is not fastened to the hub B, as is generally the case, but moves loosely on the same. Against A is placed the sleeve C, mounted firmly on B, which carries the gear-wheel G. Both A and G are provided with the clutching-teeth $a$ and $g$, respectively, which may engage each other when the gear-wheel G is moved against A, in which position the device would operate the ordinary gear of the wheel. G is mounted on C in such a manner as to slide horizontally on the same, being prevented from turning around it by the ribs $Z'$ and $Z^2$. G is provided with the annular recess $m$, which engages the contact-shoes $N'$ and $N^2$ of the shifting lever M. G meshes permanently with a second gear-wheel H, which is mounted on the hub of the auxiliary sprocket-wheel D. This is placed above and engages the chain X of the wheel. D is mounted on the pivot E on bracket F, which is fastened to the frame of the wheel by means of a suitable sleeve or sleeves and which carries at the same time the tubular bearing L for the axle of the shifting lever M. The bracket may be attached to the right-hand rear and lower braces of the wheel, as shown in the drawings, or to either of them, according to the special construction of the wheel to which our device is to be attached. Gear-wheel H is provided with the annular recess, in which engage the contact-shoes $N^3$ and $N^4$ of the shifting lever M. D and H are provided with the clutching-teeth $d$ and $h$, respectively, which are adapted to engage each other and to operate in this manner the low-speed gear of our construction. The shifting lever M is provided in O with a segment of a bevel-gear which engages the corresponding teeth of pinion P, forming the lower end of the lever-shaft Q, which is attached to the right-hand brace of the rear wheel by means of the brackets R and R'. R' is provided with two arms S S', connected by the arc T, serving as a support and guide for the operating-handle U, which is prevented from being moved beyond the ends of T by the small nose Y Y'.

V shows a protecting-cover for the gear mechanism.

If it is desired to operate our device so as to use the low-speed gear, the handle U, which is within easy reach of the rider under the saddle, is moved from its normal position at Y' to the opposite end of the arc at Y. By this movement the clutching-teeth $a$ and $g$ disengage and A runs loose on hub B, at the same time the clutching-teeth $d$ and $h$ engage and the wheel is propelled by the motion transmitted to it by the gear-wheels H and G only.

The reduction of speed as produced by our gear is changeable and depends on the number of teeth of the gear-wheels. In our illustrations A has seven teeth, E nine teeth, G thirty-four teeth, and H twenty-two teeth. The original speed of A is consequently reduced by the operation of our gear, as shown, to: A:E multiplied with H:G, or 7:9 multiplied with 22:34, equal to 77:153, or 0.503 times the original speed of the wheel at the same number of revolutions of the crank-axle. The auxiliary sprocket-wheel may be placed below the lower chain to obtain the same effect, but must always be placed outside of the run of the chain.

What we claim as new, and desire to secure by Letters Patent, is—

1. In a differential gear for bicycles, the combination of an auxiliary sprocket-wheel, placed outside and engaging the driving-chain, two gear-wheels movable on sleeves and meshing permanently, a sprocket-wheel adapted to run loose on its seat when the gear is operated and suitable means adapted to simultaneously throw one gear-wheel into engagement with the loose sprocket-wheel and the other gear-wheel out of engagement with the auxiliary sprocket-wheel, and vice versa, for the purpose as set forth and described.

2. In a differential gear for bicycles, the combination of an auxiliary sprocket-wheel, placed outside and engaging the driving-chain, two gear-wheels movable on sleeves and meshing permanently, a sprocket-wheel adapted to run loose on the hub of the rear wheel when the gear is operated, a crank-shaft bearing a sprocket-wheel, a driving-chain and a shifting lever adapted to simultaneously throw one gear-wheel into engagement with the loose sprocket-wheel on the wheel-hub and the other gear-wheel out of engagement with the auxiliary sprocket-wheel, or vice versa, all for the purpose as shown and described.

LOUIS PH. COHEN.
HERMAN C. WOLTERECK.

Witnesses:
GEO. F. BENTLEY,
PAUL C. SCHWITZLER.